United States Patent [19]
Egami et al.

[11] Patent Number: 4,636,648
[45] Date of Patent: Jan. 13, 1987

[54] COATING QUALITY MEASURING DEVICE

[75] Inventors: Tsuneyuki Egami, Gamagori; Tsutomu Saito, Okazaki; Mitosi Ando, Nishio; Ryuzou Hori; Takashi Kamo, both of Toyota; Kazunori Yoshida, Okazaki, all of Japan

[73] Assignees: Nippon Soken, Inc., Nishio; Toyota Jidosha Kabushiki Kaisha, Toyota, both of Japan

[21] Appl. No.: 777,680

[22] Filed: Sep. 19, 1985

[30] Foreign Application Priority Data

Sep. 20, 1984 [JP] Japan ................. 59-197706

[51] Int. Cl.⁴ ............................... G01V 9/04
[52] U.S. Cl. ..................... 250/571; 250/566
[58] Field of Search ............... 250/571, 566; 356/431, 356/430, 429

[56] References Cited

U.S. PATENT DOCUMENTS 4,522,497 6/1985 Ikin ........................ 250/571

FOREIGN PATENT DOCUMENTS 52-71289 6/1977 Japan .
52-90988 7/1977 Japan .
58-97608 6/1983 Japan .

Primary Examiner—Gene Wan
Attorney, Agent, or Firm—Cushman, Darby & Cushman

[57] ABSTRACT

A coating quality measuring device has a pattern plate including one reference pattern portion having a larger pattern width and a plurality of strip pattern portions having different pattern widths which are smaller than that of the reference pattern portion and are decreased in order. The pattern plate is disposed opposite the coated surface. The pattern plate is reflected on the coated surface and a reflected image is formed on an image sensor. The image sensor successively outputs signals each corresponding to the lightness of each pattern portion on a line extending in a width direction of each pattern portion of the reflected image. A computing device calculates a difference between the peak value of the signal level of the output signal corresponding to each strip pattern portion in the reflected image and the signal level of the output signal corresponding to the ground portion, divides the calculated difference by the signal level of the output signal corresponding to the reference pattern portion and detects the pattern width of the strip pattern portion wherein the division value becomes not larger than a predetermined value, thereby to obtain the coating quality of the coated surface.

6 Claims, 9 Drawing Figures

COATING QUALITY MEASURING DEVICE

BACKGROUND OF THE INVENTION

1. Field of the Invention

The present invention relates to a device for quantitatively measuring the coating quality of a coated surface.

2. Description of the Prior Art

The coating quality of coated surfaces of a vehicle body or the like has been conventionally measured through the senses such as the sense of sight of a trained workman. This measuring method has such a defect as being largely affected by his feeling and obstructs the automation of the production steps of vehicles.

From the above circumstances, devices for objectively measuring the coating quality of the coated surface have been developed.

Examples of these devices are disclosed in Japanese unexamined patent publications Nos. Sho 52-71289 and Sho 58-97608, for example. Each of these devices quantitatively measures the coating quality of the coated surface by positioning a pattern plate having a slit pattern opposite the coated surface and applying light to the coated surface through the slit pattern to form a reflected image of the slit pattern. In this case, the change of sharpness of outlines of the formed reflected image of the slit pattern is quantitatively measured.

Japanese unexamined patent publication No. Sho 52-71289 discloses the steps of slicing the reflected image on a plurality of levels, and detecting the change of the pattern width on each level. In this method, when the pattern width on each level changes small the outline of the reflected image is judged to be sharp, namely the coating quality of the coated surface is judged to be high.

In Japanese unexamined patent publication No. Sho 58-97608, frequency components composing the reflected image is detected. In this method when the frequency components are on the high frequency side, the outline of the reflected image is judged to be sharp.

However, the device of Japanese unexamined patent publication No. Sho 52-71289 has a problem that it is extremely difficult to measure slight difference in coating quality between the coated surfaces of high coating quality. And the device of Japanese unexamined patent publication No. Sho 58-97608 also has a problem that the calculation for obtaining the frequency components is comparatively complex.

SUMMARY OF THE INVENTION

It is an object of the present invention to provide a coating quality measuring device which can accurately measure the coating quality of a coated surface by using comparatively simple calculation.

It is another object of the present invention to provide a coating quality measuring device which measures the coating quality of a coated surface by detecting the lightness change of a strip pattern image reflected on the coated surface.

It is still another object of the present invention to provide a coating quality measuring device, which measures the coating quality of the coated surface from the pattern width of the strip pattern portion of which reflected image has lightness equal to a predetermined value.

The coating quality measuring device of the present invention comprises a pattern plate disposed opposite a coated surface to be measured. The pattern plate is provided with a plurality of strip pattern portions having different pattern widths, which are arranged on a surface of the pattern plate opposite the coated surface at intervals. Each of the strip pattern portions have lightness different from that of a ground portion of the pattern plate. The device further comprises an image-pickup means for image-forming a reflected image of the pattern plate, which is reflected on the coated surface, scanning the formed reflected image along a line extending in a width direction of each pattern portion and successively generating on output signal having a signal level corresponding to the lightness of each portion on the scanned line; and a computing means for calculating the difference between the peak value of the signal level of the output signal corresponding to each of the strip pattern portions in the reflected image and the signal level of the output signal corresponding to the ground portion and detecting the pattern width of the strip pattern portion wherein the calculated difference reaches a predetermined value, thereby to obtain the coating quality of the coated surface.

DETAILED DESCRIPTION OF THE EMBODIEMENT

Figure 1:
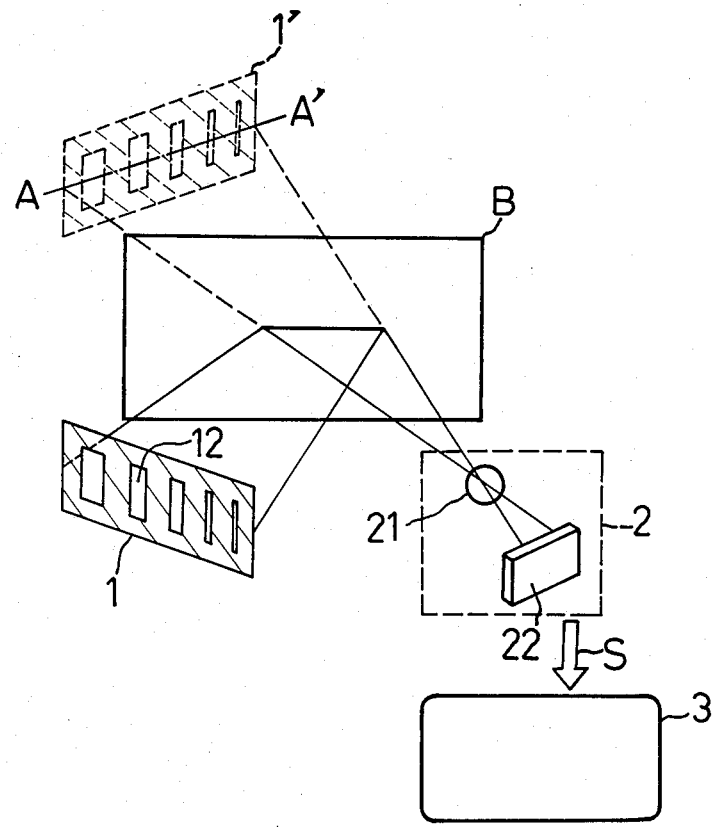
FIG. 1 is a diagrammatic view of the device of the present invention.

In FIG. 1, a pattern plate 1 is disposed opposite a coated surface B to be measured. A reflected image 1' of the pattern plate 1, which is formed after being reflected on the coated surface B, is image-formed on a charge coupled device (CCD) image sensor 22 provided in an image-pickup means by way of a lens 21 thereof.

The image sensor 22 is provided with a large number of light reception elements along or near the center line of the reflected image 1' (line A—A' in FIG. 1). Each of the light reception elements generates an output signal in proportion to the light reception amount thereof.

A computing circuit 3 receives the output signals from the light reception elements and calculates the coating quality of the coated surface.

Figure 2:
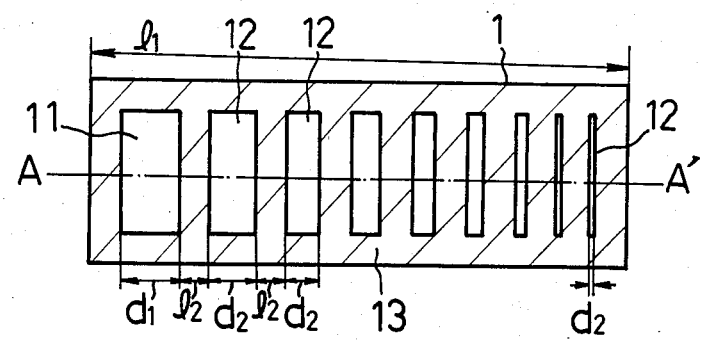
FIG. 2 is a front view of a pattern plate.

FIG. 2 illustrates the detailed structure of the pattern plate 1. The pattern plate 1 is formed of a transparent plate glass of a length $l_1$, for example. A pattern portion 11 of a width $d_1$ and a plurality of pattern portion 12 of a width $d_2$ are formed on the pattern plate 1 at constant intervals $l_2$ by evaporating a metal such as chromium on the plate glass except for the portions corresponding to the pattern portions 11 and 12. This results in a ground portion 13 having low lightness and the pattern portions 11 and 12 having high lightness being formed.

In this embodiemnt, the pattern portion 11 has a width ($d_1$) of about 10mm and acts as a reference pattern portion. The width $d_2$ of the pattern portions 12 is decreased in order from 9 mm to 0.5 mm. The pattern width of the pattern portions 12 in the reflected image 1' measured on the coated surface B becomes smaller (5 mm to 0.2 mm). And $l_1$ and $l_2$ are set to 200 mm and 5 mm, respectively.

Figure 3:
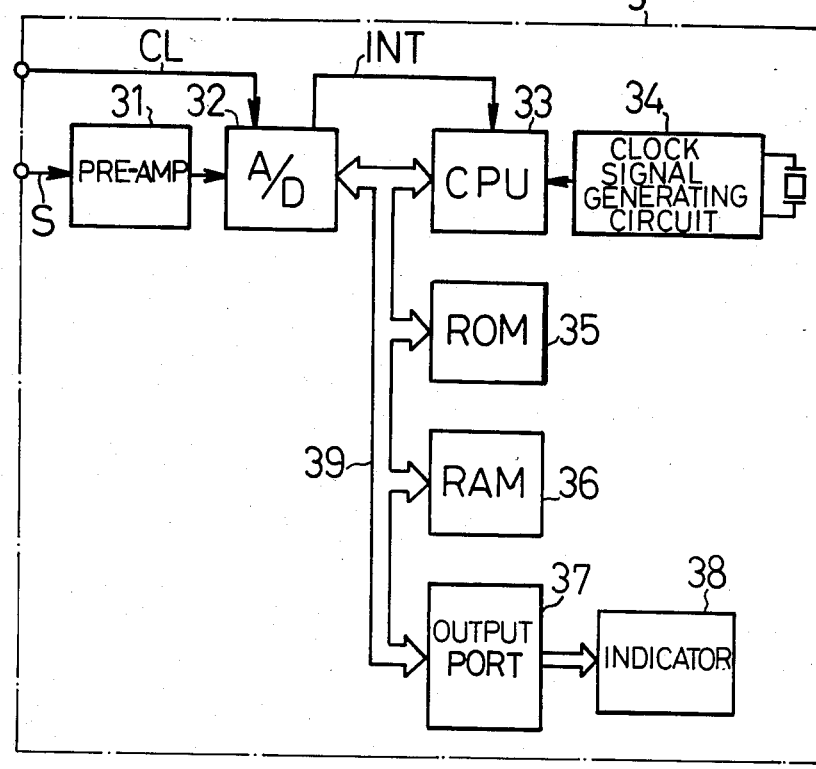
FIG. 3 is a block diagram illustrating the structure of a computing circuit.

FIG. 3 illustrates the structure of the computing circuit 3. The computing circuit 3 is provided with a PRE-AMP 31 for amplifying a series of output signals S from the image sensor 22, and A/D converter 32 for converting the amplified output signals S to digital data simultaneously with a clock signal CL from the image sensor 22 and generating an interruption signal(INT) at the end of the conversion, a micro computer (CPU)33, a clock signal generating circuit 34 for generating a clock signal which determines the processing timing of the CPU 33, a read only memory(ROM) 35 for accommodating a control program, a random access memory(RAM) 36 for workarea, an output port 37 and an indicator 38. The A/D converter 32, the CPU 33, the ROM 35, the RAM 36 and the output port 37 are connected to one another by means of a data bus 39.

Hereinafter, the operation of the coating quality measuring device according to the present invention will be explained.

Figure 4A:
FIGS. 4a to 4c are views, each illustrating the signal level of output signals from an image-pickup means on each of coated surfaces having different coating quality.
Figure 4B:
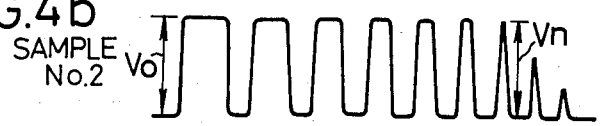
Figure 4C:

FIGS. 4a to 4c illustrate the signal level of the output signals S of each light reception element of the image sensor 22 to coated surface samples No. 1 to No. 3 which are previously estimated to 3 ranks through a person's senses so that the coating quality thereof becomes lower in order. As is apparent from the drawings, the signal level of each output signal changes with the lightness change of the pattern portions 11 and 12 and the ground portion 13.

In the drawings, the signal level corresponding to the reference pattern portion 11 is expressed by $V_O$ and the signal level corresponding to the nth pattern portion 12 from the pattern portion 12 nearest to the reference pattern portion 11, is expressed by $V_n$. In this embodiment, n is 8.

As the coating quality of the coated surfaces becomes lower, even the signal level corresponding to the pattern portion 12 having a larger pattern width $d_2$ drops.

The pattern width $d_1$ of the reference pattern portion is made so large that the lightness of the reflected iamge is not affected by the coating quality of the samples No. 1 to No. 3.

Figure 5:
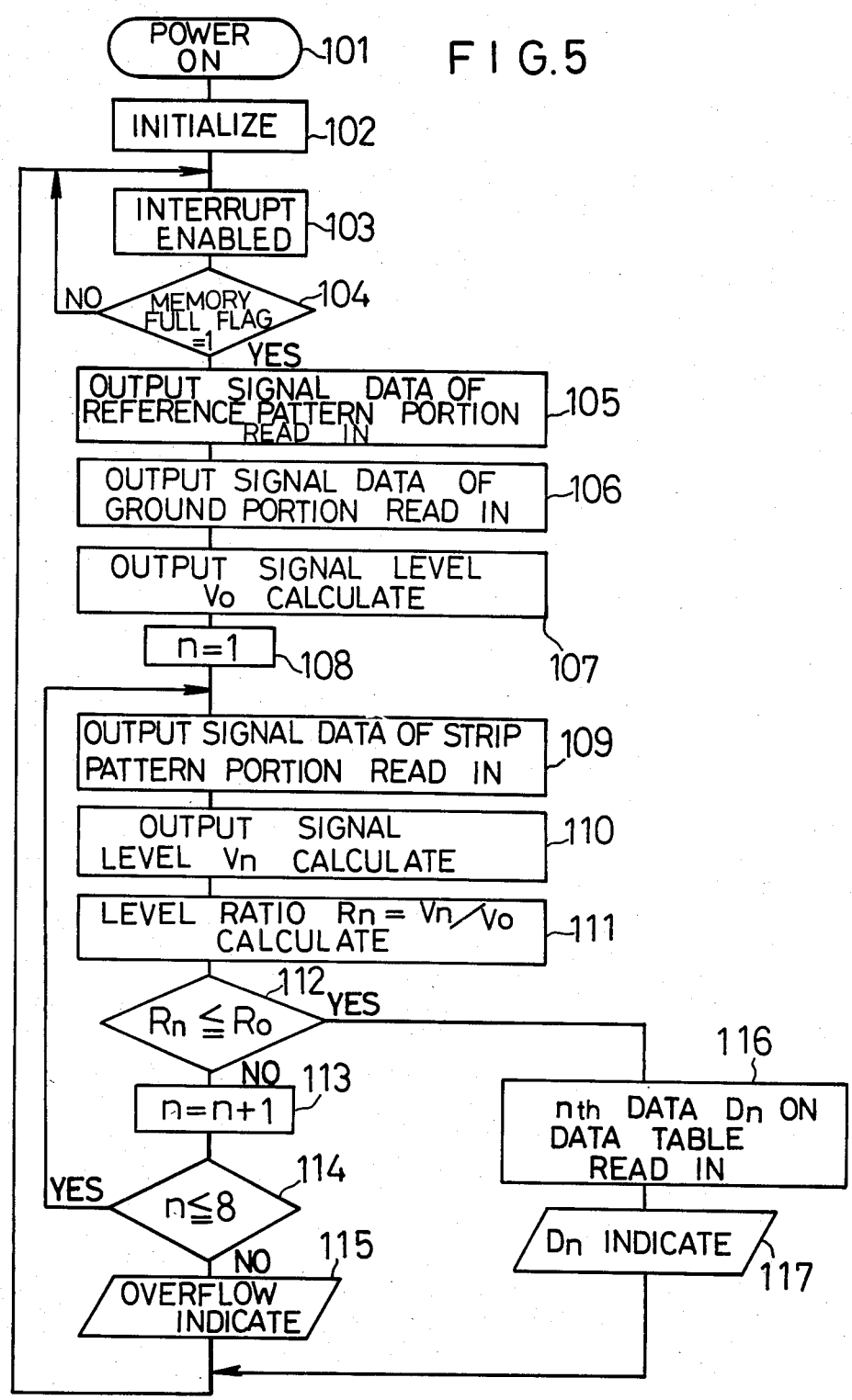
FIGS. 5 and 6 are prgram flow charts each illustrating the data processing routine of the computing circuit.
Figure 6:
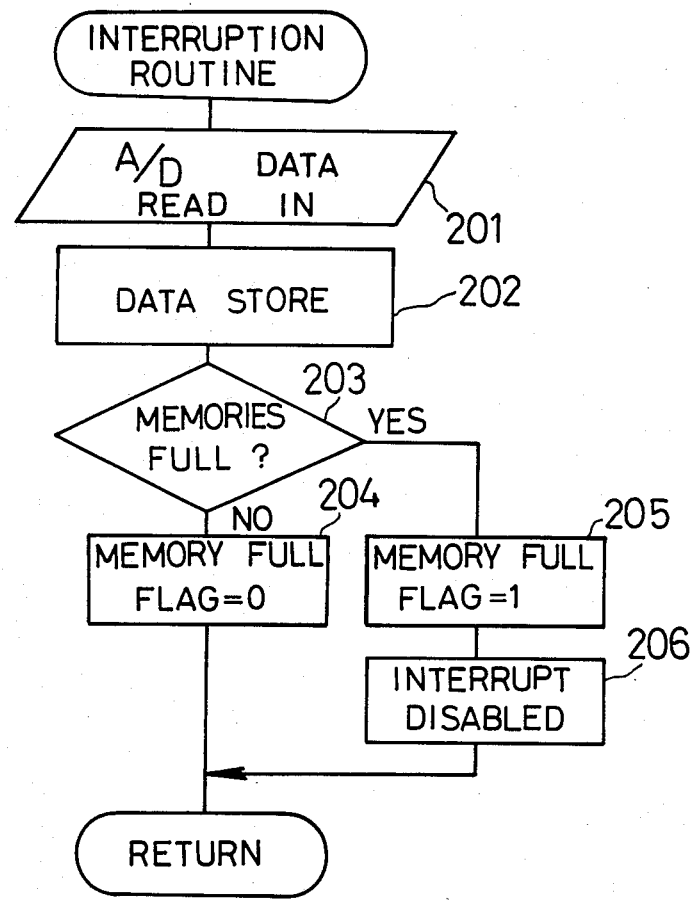

FIGS. 5 and 6 illustrate the data processing routine of the CPU 33(FIG. 3). When power is turned on(Step 106), the routine is started.

In Step 102, the initialization such as the reset of the output port 37 for clearing the indicator 38 and the clearing of the memories is executed. In Step 103, the interruption of the interruption signal(INT) from the A/D converter 32 is continuously enabled.

When the interruption signal(INT) is supplied from the A/D converter 32 at this time, the interruption routine is executed.

In Steps 201 and 202, A/D converted output signal data is read in and stored in memories. When the data is stored in all of the above described memories of which the number is the same with that of the light reception elements of the image sensor 22(Step 203, the memory full flag is set(Step 205), the interruption is disabled(Step 206) and this routine is returned.

When the data is not stored in all of the above described memories(Step 203), the memory full flag is reset (Step 204) and this routine is returned.

When the memory full flag is not set in Step 104, Steps 103 and 104 are repeated.

When the memory full flag is set in Step 104, the above described output signal data corresponding to the reference pattern portion 11 out of the output signal data stored by the memories is read (Step 105) and the output signal data corresponding to the ground portion 13 of the pattern plate 1 is read (Step 106). Then, the output signal level $V_O$ is obtained by calculating the difference between the above described two output signal data (Step 107).

In Step 108, the count value is set to 1. Next, the output signal data corresponding to the strip pattern portion 12 indicated by the count value is read(Step 109) and the output signal level $V_O$ is obtained by calculating the difference between the output signal data read in Step 109 and that corresponding to the ground portion 13 (Step 110).

In Step 111, the level ratio $R_n(=V_n/V_O)$ is calculated. When $R_n$ is larger than a predetermined value $R_O$(Step 112), the steps beginning with Step 113 are executed and when $R_n$ is not larger than $R_O$, the steps beginning with Step 116 are executed.

In Step 113, the count value is incremented. When n is not larger than 8(Step 114), the steps beginning with Step 109 are repeated. When n is larger than 8(Step 114), "OVERFLOW" is indicated on the indicator 38 in Step 115.

In Step 116, the data $D_n$ on the data table, which corresponds to the count value when $R_n$ is not larger than $R_O$, is read. And in Step 117, the read data $D_n$ is indicated on the indicator 38. The above described data table previously stores the pattern width $d_2$ of the nth strip pattern portion 12.

Figure 7:
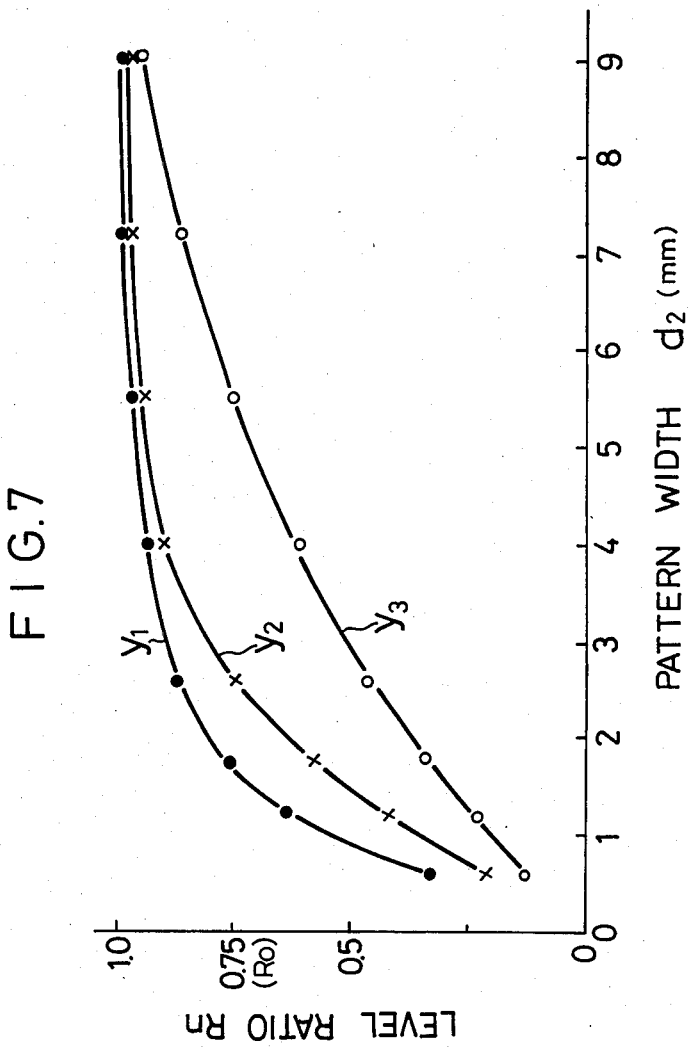
FIG. 7 is a graph showing the relation between the strip pattern width and the level ratio with respect to the coated surfaces having different coating quality.

The above described level ratio $R_n$ to each of the coated surfaces B having different coating quality differently changes with the pattern width change of the strip pattern portions 12 as shown in FIG. 7.

In FIG. 7, the lines $y_1$ to $y_3$ show the change of the level ratio $R_n$ to the coated surfaces B of which the coating quality becomes lower in order.

In this embodiment, the above described value $R_O$ is set to 0.75. In this case, the pattern width $d_2$ satisfying the relation of $R_n \leq R_O$ is 1.75 mm in the line $y_1$, 2.6 mm in the line $y_2$ and 5.5 mm in the line $y_3$ as is apparent from FIG. 7. Namely, as the coating quality of the coated surface B becomes higher, the above described pattern width $d_2$ satisfying the above relation becomes smaller.

As is clear from the above explanation, the coating quality of the coated surface B can be quantitatively detected by indicating the pattern width data $D_n$ satisfying the relation of $R_n \leq R_O$.

In the above embodiment, the strip pattern portions 12 are formed on the pattern plate so taht the pattern width ($d_2$) thereof decreased in order. Instead, when the level ratio $R_n$ of all of the strip pattern portions 12 is obtained, such an arrangement of the strip pattern portions 12 as disclosed in the above embodiment need not be always required.

Furthermore, a photodiode array or the like may be used in place of the CCD image sensor. And a sensor of an area-type can be substituted for the sensor of a line-type. In this case, the data processing is executed in every line. And by obtaining output signals from a plurality of lines and calculating an average signal level, an accurate measuring result can be obtained.

Furthermore, in the above embodiment, by calculating the output signlas and the pattern width between adjacent pattern portions 12 by interpolation, a more accurate measurement result can be obtained.

In addition, the pattern plate can be illuminated from the back thereof. In this case, lightness difference between the ground portion and the pattern portions becomes large to increase the measurement sensitivity.

As described above, the coating quality measuring device of the present invention is provided with a pattern plate wherein a plurality of pattern portions having different pattern widths are formed at intervals, which are disposed opposite a coated surface to be measured, and an image-pickup means for image-forming a reflected image reflected on the coated surface and generating output signals each corresponding to the lightness of each pattern portion of the reflected image. According to the present invention, the coating quality can be measured by detecting the pattern width of the pattern portion of which the output signal reaches a predetermined level.

Furthermore, according to the present invention, a reference pattern portion is formed in the pattern plate and the ratio of the output signal of each strip pattern portion to that of the reference pattern portion in the reflected image is obtained. Therefore, the measurement accuracy is not dropped by the extraneous light incident upon the coated surface.

What is claimed is:

1. A coating quality measuring device for measuring the coating quality of a coated surface, comprising:

a pattern plate disposed opposite the coated surface to be measured; said pattern plate being provided with a plurality of strip pattern portions having different pattern widths, which are arranged on a surface of said pattern plate opposite the coated surface at intervals, each of said strip pattern portions having lightness different from that of a ground portion of said pattern plate;

an image-pickup means for image-forming a reflected image of said pattern plate, which is reflected on the coated surface; scanning the formed reflected image along a line extending in a width direction of each pattern portion and successively generating an output signal having a signal level corresponding to the lightness of each portion on the scanned line; and a computing means for calculating the difference between the peak value of the signal level of the output signal corresponding to each of said strip pattern portions in the reflected image and the signal level of the output signal corresponding to the ground portion and detecting the pattern width of said strip pattern portion wherein the calculated difference reaches a predetermined value, thereby to obtain the coating quality of the coated surface.

2. A coated surface measuring device according to claim 1, wherein said pattern plate is further provided with one reference pattern portion having a pattern width large enough not to change the peak value of lightness of a portion corresponding to said reference pattern portion in the reflected image due to the coating quality of the coated surface.

3. A coated surface measuring device according to claim 2, wherein said pattern plate is made of a transparent plate glass and said ground portion is formed by evaporating a metal on said transparent plate glass except for portions corresponding to said strip pattern portions.

4. A coated surface measuring device according to claim 1, wherein said image- pickup means comprises a lens for forming the reflected image, and an image sensor having a large number of linearly arranged light reception elements which generates light reception signals corresponding to the lightness of the formed reflected image; said image sensor successively outputting the light reception signals simultaneously with a clock pulse.

5. A coating quality measuring device according to claim 2, wherein said computing means divides the calculated difference by the signal level of the output signal corresponding to said reference pattern portion and detects the pattern width of said strip pattern portion wherein the calculated division value reaches a predetermined value, thereby to obtain the coating quality of the coated surface.

6. A coating quality measuring device according to claim 1, wherein the pattern width of said strip pattern portions of said pattern plate is set so that the pattern width in the reflected image of said pattern portion is decreased in order in the range from 0.2 mm to 5 mm.

* * * * *